United States Patent
Sesay et al.

(10) Patent No.: US 6,454,949 B1
(45) Date of Patent: Sep. 24, 2002

(54) HIGHLY ACCELERATED PROCESS FOR REMOVING CONTAMINANTS FROM LIQUIDS

(75) Inventors: Sahid Sesay, Alameda; Edison Mbayo, San Jose, both of CA (US)

(73) Assignee: Baffin, Inc., Alameda, CA (US)

( * ) Notice: Subject to any disclaimer, the term of this patent is extended or adjusted under 35 U.S.C. 154(b) by 22 days.

(21) Appl. No.: 09/664,861

(22) Filed: Sep. 19, 2000

(51) Int. Cl.[7] .................................................. C02F 1/56
(52) U.S. Cl. .................... 210/709; 210/716; 210/721; 210/725; 210/727; 210/728; 210/734; 210/96.1; 210/199; 210/206; 210/912
(58) Field of Search ............................... 210/709, 716, 210/721, 724, 725, 726, 727, 728, 732, 733, 734, 735, 738, 739, 743, 746, 96.1, 97, 199, 202, 206, 208, 912, 913; 252/175, 180, 181; 524/922

(56) References Cited

U.S. PATENT DOCUMENTS

| | | | | |
|---|---|---|---|---|
| 4,415,467 A | * | 11/1983 | Piepho ........................ | 252/181 |
| 4,450,092 A | * | 5/1984 | Huang ........................ | 252/181 |
| 4,465,593 A | * | 8/1984 | Wemhoff .................... | 210/96.1 |
| 4,588,508 A | * | 5/1986 | Allenson et al. ............ | 210/708 |
| 4,724,084 A | * | 2/1988 | Pahmeier et al. ........... | 210/709 |
| 5,045,213 A | * | 9/1991 | Bowers ...................... | 210/709 |
| 5,084,186 A | * | 1/1992 | Gilchrist ..................... | 210/709 |
| 5,516,435 A | * | 5/1996 | Lewellyn ..................... | 210/728 |
| 5,614,102 A | * | 3/1997 | Sakurada ..................... | 210/718 |
| 5,753,125 A | * | 5/1998 | Kreisler ...................... | 210/710 |
| 6,048,463 A | * | 4/2000 | Selvarajan et al. .......... | 210/727 |
| 6,171,506 B1 | * | 1/2001 | Allen et al. ................. | 210/728 |
| 6,235,205 B1 | * | 5/2001 | Huang et al. ................ | 210/723 |

* cited by examiner

Primary Examiner—Peter A. Hruskoci
(74) Attorney, Agent, or Firm—Lyon & Lyon LLP

(57) ABSTRACT

A process for removing metals from wastewater, which comprises the following: measuring the flow rate and oxidation reduction potential of wastewater as it is fed into a first treatment tank, adjusting the pH of the wastewater, adding a first liquid elixir to the wastewater to react with at least one metal in the wastewater to cause it to either precipitate out of solution, or convert into a form that will allow it to be precipitated out of solution by a second liquid elixir, and to bond with the metal to prevent it from re-dissolving back into solution, adding a second liquid elixir to the wastewater to react with at least one metal in the wastewater to cause it to precipitate out of solution, and to bond with the metal to prevent it from re-dissolving back into solution, feeding the wastewater into a second treatment tank, mixing a third liquid elixir and a fourth liquid elixir into the wastewater to flocculate and/or coagulate the precipitated metals, and separating the flocculated and/or coagulated precipitated metals from the clear water.

28 Claims, 5 Drawing Sheets

HIGHLY ACCELERATED PROCESS FOR REMOVING CONTAMINANTS FROM LIQUIDS

FIELD OF THE INVENTION

This invention pertains to the field of removing contaminants from a liquid, including, more specifically, removing heavy metals from industrial wastewater.

BACKGROUND OF THE INVENTION

Many industrial processes produce wastewater streams that are laden with contaminants. These industrial processes include, among others, electroplating, galvanizing, anodizing, chelating, metal finishing, printed circuit board (PCB) manufacturing, semiconductor, magnetic disk manufacturing, mining operations, photo processing, fungicide manufacturing, food preparation, paper and pulp, textile, and oil refining. The wastewater streams of these different processes may contain any number of contaminants, including heavy metals, organic wastes, and inorganic wastes. In regard to heavy metal contaminants, they generally include, but are not limited to, metals such as copper, iron, gold, lead, nickel, silver, tin, zinc, chromium, cadmium, and arsenic.

The presence of these metals in wastewater causes the wastewater to be highly toxic. They can make the wastewater corrosive, inflammable, and even explosive. Due to the toxicity of metal laden wastewater, it poses a real danger of damaging wastewater collection systems, such as publicly owned treatment works (POTW), and of harming the environment.

In order to address the risks that metal laden wastewater presents, strict regulations have been imposed on plants regarding their wastewater discharges. Various agencies currently set maximum limits on the quantity of metals that plants may discharge into their waste streams. Where a plant discharges its wastewater to a POTW, these maximum limits are set either by the POTW itself, or by a municipal agency. And where a plant is discharging its wastewater directly to the environment, the maximum limits are typically set by state regulatory agencies and/or the Environmental Protection Agency.

Because of this need to minimize the quantity of metals discharged, plants treat their wastewater streams to remove the majority of the metals present. Since each metal has an optimum pH at which it will precipitate out of wastewater, plants have conventionally removed these metals individually using hydroxide precipitation over a series of pH adjustments, or by segregating waste streams that contain different metals and treating them individually. At each pH adjustment, at least one metal present in the wastewater will react with the treatment chemicals that have been added and will precipitate out of the wastewater. The metal precipitates must also be given a sufficient amount of time to settle out. The wastewater is then moved to another tank for the next pH adjustment. The wastewater must be moved to a new tank because once the pH level is changed, the metal that was just removed will have a tendency to re-dissolve back into solution.

For example, metals such as iron precipitate out of solution at lower pH levels, while metals such as nickel and cadmium precipitate out at higher pH levels. At a lower pH level, iron will precipitate out of solution, but if the pH level is then increased in order to remove other metals, the iron will dissolve back into solution. To solve this problem the wastewater is typically moved to a new treatment tank after a pH adjustment, leaving behind the metal that just precipitated out.

One drawback of known treatment processes is the length of time the precipitation of metals normally takes. Known methods chemically treat each metal separately, which requires many pH adjustments. In addition, the use of existing coagulants in known systems causes the metals to settle out slowly. Furthermore, known systems typically require a final pH adjustment prior to discharge. Thus the end result of all of these potential bottlenecks is that the entire operation may take anywhere from several hours to several days to complete.

Another drawback of known treatment systems is that when a plant generates several waste streams that each contain different metals, the waste streams are treated separately due to the problems involved in treating wastewater with multiple metals. This either forces a plant to implement more than one wastewater treatment system, or forces a plant to treat its waste streams one at a time. These limited options cause the plant to incur additional time and expense to treat all of its wastewater.

The fact that these processes can also be labor-intensive adds another source of time consumption. For example, plant operators often have to manually determine pH levels and manually add acid or base to adjust the pH levels, especially when spikes in metal concentrations occur. In addition, the chemicals that are added to the wastewater to precipitate out the metals can be in either solid or liquid form. This makes the addition of these chemicals into treatment tanks a more time-consuming process because operators typically add the solid chemicals manually, or have to initially mix the solid chemicals into clean water prior to adding it into the wastewater.

Another drawback to known systems is the fact that a plant's treatment process normally has to be tailored to the specific composition of that individual plant's wastewater so that it effectively removes the metals present. Generally, plants cannot simply implement an "off-the-shelf" process for treating their wastewater. Instead, plants typically have to design a treatment process around their effluent streams. This means that in the event of a system upset, for example higher levels of a metal or the introduction of a new metal in the wastewater, the treatment process will typically be less effective or ineffective altogether. The unfortunate result of this may be an unlawful discharge of metals. Thus, plants must continuously monitor the composition of their wastewater streams and modify the treatment processes and the chemicals they use to effectively treat their wastewater.

Other drawbacks of known systems relate to flocculation and coagulation when known flocculants and coagulants are mixed into the wastewater. Coagulation is the process of combining the suspended metal solids, typically in the form of colloids or flocs, into larger and heavier particles. These larger particles become too heavy to remain suspended in the wastewater and drop to the bottom of the solution. A slightly different process that has similar results is flocculation, which is the process of physically trapping and/or linking the flocs together, typically through the use of a polymer. In known systems, one drawback is that most polymers are supplied in powder form, requiring the users to mix the powder into water prior to adding it into the wastewater. This is labor-intensive and time consuming process. Another drawback is that when flocculants are mixed into the wastewater, their flocculation effects are retarded by the mixing blades which tend to break-up the flocs that form. This results in sludge which is difficult to remove from the wastewater and from filters. In addition, the difficulty of removing sludge from filters is exacerbated by the fact that often, due to the use of high quantities of lime, the sludge is slimy and clings to filters, resulting in a high filter replacement rate.

Accordingly, there is a need for a process to remove metals from wastewater that is less time consuming and does not need to be specifically tailored for the wastewater composition of each plant in which it is used, and that also addresses the other drawbacks of known systems that were mentioned above.

SUMMARY OF THE INVENTION

The present invention addresses many of these aforementioned problems. The present invention is a process for treating wastewater that is faster than known methods, can be used on different compositions of wastewater without the need to individually tailor the process or chemicals to the specific composition of the wastewater, and produces a clear, virtually metal-free supernatant with a non-slimy sludge that has a high metal concentration. The system of the present invention is also easier to use and implement than known systems because only four chemicals are used in the system and all four of the chemicals are in liquid form.

The process of the present invention preferably comprises the following: measuring the flow rate of wastewater as it is fed into a first treatment tank; measuring the oxidation reduction potential of the wastewater; adjusting the pH of the wastewater to a level within a range of pH 9.3 to pH 9.5; mixing a first liquid elixir into the wastewater to react with any metal ions and/or chelates to form metal sulfates and/or less soluble metal complexes, and to bond with any metal sulfates created to prevent them from re-dissolving back into the wastewater, wherein the quantity of the first liquid elixir added to the wastewater is determined based at least in part upon the oxidation reduction potential of the wastewater and further based at least in part upon the flow rate of the wastewater; mixing a second liquid elixir into the wastewater to be treated to react with any metal sulfates and/or chelated metals to form insoluble metal hydroxides, and to bond with any metal hydroxides created to prevent them from re-dissolving back into the wastewater, wherein the quantity of the second liquid elixir added to the wastewater is determined based at least in part upon the quantity of the first liquid elixir added to the wastewater; feeding the wastewater into a second treatment tank; mixing a third liquid elixir into the wastewater to flocculate and coagulate the precipitates, wherein the quantity of the third liquid elixir added to the wastewater is determined based at least in part upon the quantity of the first liquid elixir added to the wastewater; mixing a fourth liquid elixir into the wastewater to flocculate and coagulate the precipitates, wherein the quantity of the fourth liquid elixir added to the wastewater is determined based at least in part upon the quantity of the first liquid elixir added to the wastewater; and separating the flocculated and coagulated precipitates from the wastewater.

DETAILED DESCRIPTION OF THE INVENTION

Figure 1:
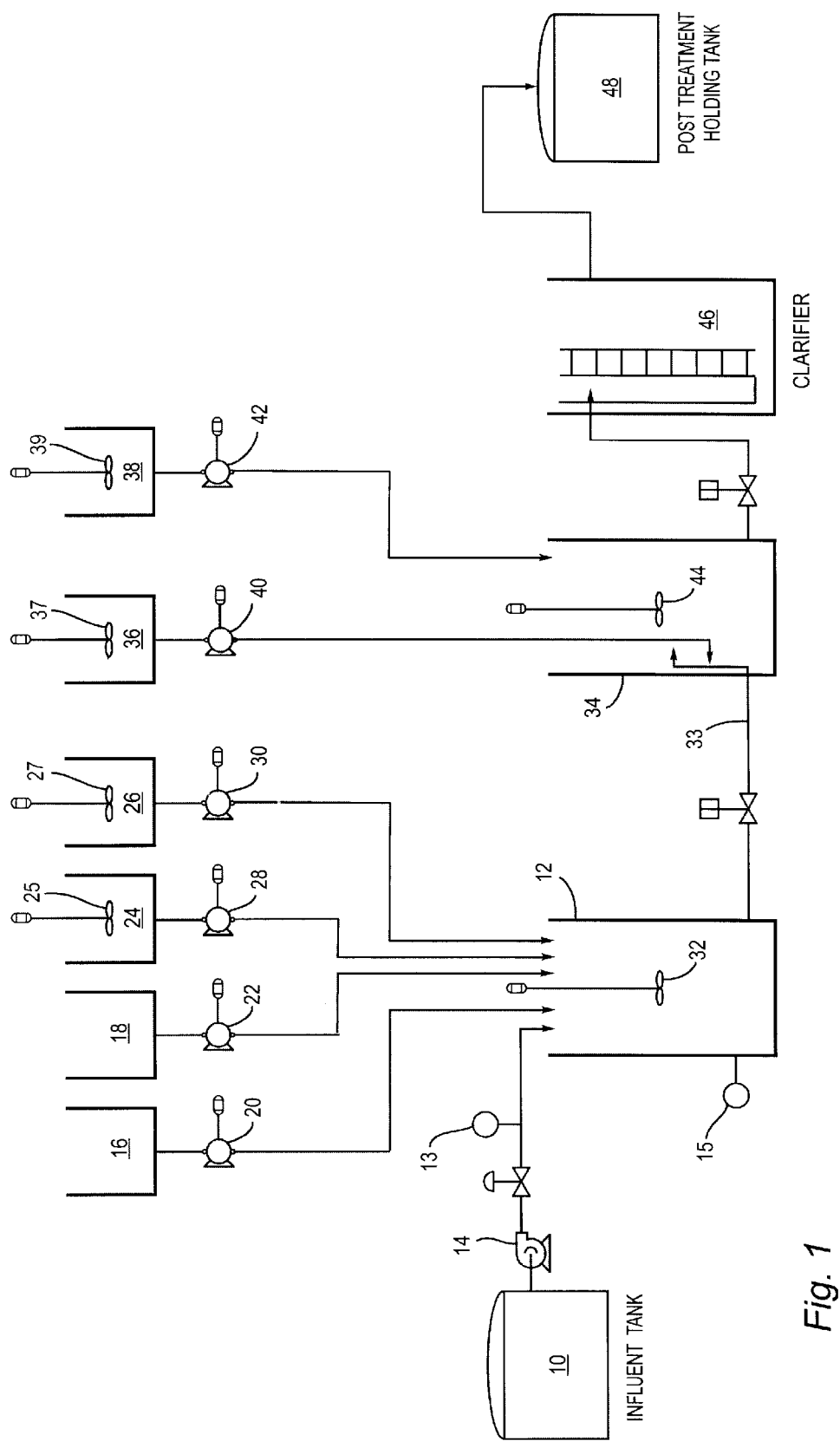
FIG. 1 is an illustration of the physical equipment that is used to carry out the process of the present invention in a continuous manner using tanks.

The present invention is a novel and innovative process for rapidly removing contaminants from wastewater. More specifically, the present invention comprises a multi-step process for removing the great majority of dissolved metals from wastewater. The metals may exist in a variety of forms, including but not limited to existing as metal ions, metal hydroxides, metal sulfates, metal sulfides, complexed and chelated metals. The process utilizes up to four chemical mixtures, and for clarity purposes, these four chemical mixtures are referred to herein as "elixirs". Two of these elixirs are pre-treatment solutions. The other two elixirs are highly active polymer solutions. All four elixirs are in liquid form.

It should be noted that although this specification addresses the removal of dissolved metals from wastewater, the process of the present invention is also effective in removing other contaminants, including organic and inorganic material, from water.

The Elixirs Used in the Present Invention

The first elixir is designed to react with any metal ions and/or chelates present in the wastewater to form metal sulfates, sulfides, and/or less soluble metal complexes. The first elixir also bonds to any metal sulfates that form to prevent them from dissolving back into the wastewater. It is preferably formulated from four different compounds that are all added to a relatively large volume of water.

In a presently preferred embodiment, the first two compounds are sulfates, preferably ferrous sulfate and aluminum sulfate. The sulfates tend to react with the metal ions in the wastewater to form metal sulfates and sulfides. The sulfates also react with chelated metals to form less soluble metals. The third compound in the first elixir is prefer ably an acid solution, such as a 75% solution of sulfuric acid. The acid is required to aid in the sulfate reactions. And the fourth compound is preferably a polymeric coagulant formulation that comprises a cationic polyelectrolyte and a soluble salt. The presently preferred mixture has a boiling point of one hundred four point four degrees Celsius, a specific gravity of 1.31, a solubility in water of 100, and a vapor pressure of seventeen point five at twenty degrees Celsius. A presently preferred cationic polyelectrolyte and aluminum salts mixture for use in the present invention is the commercially available COAGULITE 200, produced by DuBois Chemicals, although other polymeric coagulant and aluminum salt blends may be used. This fourth compound tends to bond with metal sulfates and sulfides, and precludes them from dissolving back into solution should the pH level of the wastewater change.

The formulation for the first elixir is more fully described in a copending U.S. patent application Ser. No. 09/664,638, which is fully incorporated herein by reference.

The second elixir of the present invention is designed to react with the metal sulfates present in the wastewater to form insoluble metal hydroxides. The bulk of these metal sulfates are formed by chemical reactions that occur when the first elixir is added to the wastewater. The second elixir also bonds with the metal hydroxides that form to prevent them from dissolving back into the wastewater.

The second elixir is preferably composed of seven different compounds, again added to a relatively large volume of water. The first compound is preferably calcium hydroxide, which tends to precipitate metal hydroxides from the wastewater and adjusts the pH of the wastewater. The second compound is preferably the commercially available compound METEX EPS, produced by MacDermid Incorporated of Waterbury, Connecticut, which tends to aid in the precipitation of heavy metals. METEX EPS is a mild alkaline material that typically aids in the precipitation of heavy metals and that comprises dimethylamine, and which has a pH of 12, a specific gravity of 1.176, and a freezing point of zero degrees Celsius. The third compound is preferably sodium dimethyl dithiocarbamate, which typically serves as a heavy metal precipitant. In the presently preferred embodiment this third compound comprises a 40% aqueous solution of sodium dimethyl dithiocarbamate, available under the trade name METAL GRABBER from Great Western Chemical Co. of Portland, Oreg., which has a specific gravity of 1.18, a pH of between 11.3 and 12.3 as is, a pH of between 7 and 8 for a one percent solution, and a density of 9.854 lbs/gallon. The fourth compound is preferably calcium hypochlorite, an oxidizing agent that tends to aid in cyanide destruction and the removal of dyes and pigments. It is presently preferred that this fourth compound comprises the commercially available compound INDUCOLOR CALCIUM HYPOCHLORITE GRANULES, produced by PPG Industries, Inc. of Pittsburgh, Pennsylvania, which decomposes at about 180 degrees Celsius and has a density of 65–67 pounds per cubic foot. INDUCOLOR is comprised of calcium hypochlorite blended with some inert ingredients. The fifth compound is preferably sodium hydroxide, which tends to provide hydroxide ions and precipitate metals out of the wastewater. And the sixth and seventh compounds in the second elixir are preferably polymeric coagulant formulations. The sixth compound also preferably includes a soluble salt such as calcium chloride, and the seventh compound also preferably includes organic precipitants. Examples of preferred polymeric coagulant formulations for use in the second elixir are COAGULITE 300 (which contains the calcium salt at less than 40% by weight), which has a boiling point of 104.44 degrees Celsius, a specific gravity of 1.325, a solubility in water of 100, and a vapor pressure of 17.5 at 20 degrees Celsius, and COAGULITE EMR (which contains the organic precipitants), which has a specific gravity of 1.18, a boiling of 101.66 degrees Celsius, a solubility in water of 100, and a vapor pressure of 17.5 at 20 degrees Celsius, both of which are produced by DuBois Chemicals of Cincinnati, Ohio. These compounds tend to bond with any precipitated metals and preclude them from dissolving back into the solution once they have precipitated out.

The formulation for the second elixir is more fully described in a copending U.S. patent application Ser. No. 09/664,865, which is fully incorporated herein by reference.

It is presently preferred that the first and second elixirs are used together because they are typically most effective when used in that manner. However, depending on the composition of a particular user's wastewater, use of one of these two elixirs may provide effective results. For example if a user's wastewater is comprised of only chelated metals, elixir one may be effective when used alone to remove them. Alternately, if a user's wastewater has a large amount of metal sulfates, then elixir two may be effective when used alone. Regardless of whether elixirs one and two are used separately or together, it is presently preferred that both elixirs three and four, the polymer solutions described below, be used together to effectively remove the metals from the wastewater. In an alternate embodiment, elixir three may be used alone.

The third elixir used in the present invention comprises a highly active cationic polymer solution that conditions, flocculates, and/or coagulates the precipitated metals in the wastewater that are generally present as suspended particles, also known as flocs. These flocs tend to have slightly negative surface charges, therefore the cationic third elixir is able to form bonds with these anionic flocs and bridges the flocs together. The third elixir also has the alternate effect of neutralizing the negative surface charges of some of the flocs, and this effect allows those flocs to then aggregate with other neutralized flocs into larger particles. Without this charge neutralization, the negative flocs would simply repel each other.

The third elixir preferably comprises three different polymeric coagulant formulations that are all added to a relatively large quantity of water. The first polymeric coagulant formulation preferably comprises a cationic polyelectrolyte. The second polymeric coagulant formulation preferably comprises a mixture of a cationic polyacrylamide, an acrylamide, and a cationic monomer. And the third polymeric coagulant formulation preferably comprises a liquid emulsion cationic polymer with a high molecular weight and high charge density. It is presently preferred that the polymeric coagulant formulations used in the third elixir are CLARIFLOC C310 that is water-soluble in an emulsion, that has a pH of between 6–8 at a dilution of 5 grams/liter, a flash point greater than one hundred degrees Celsius, an autoignition temperature greater than two hundred degrees Celsius, and a vapor pressure of 0.133 millimeters of mercury at twenty degrees Celsius, F04498SH that is water-soluble, and has a pH of between 3–5 at a dilution of 5 grams/liter, and FLOCULITE 402 that has a boiling point of ninety-three point thirty-three degrees Celsius, a specific gravity of 1.03, a flash point of sixty-two point seventy-seven degrees Celsius and includes petroleum distillates hydrotreated light of between fifteen and thirty percent, all of which are produced by DuBois Chemicals.

The formulation for the third elixir is more fully described in a copending U.S. patent application Ser. No. 09/664,637, which is fully incorporated herein by reference.

The fourth elixir of the present invention preferably comprises a highly active anionic polymer solution that is used for purposes that are similar to the third elixir, namely, conditioning, flocculation, and/or coagulation of the flocs to induce settlement. In addition though, unlike the third elixir, the main function of the fourth elixir is to bond with the large coagulated and flocculated particles created by elixir three and combine them into an even larger mass of sludge, which tends to dramatically increase the weight of the sludge and causes it to rapidly settle out of the water. The time required for settlement of the precipitated metals may be reduced to under one minute by the process of this fourth elixir. This action by the fourth elixir also tends to minimize floc break-up, which is sometimes caused by mixer blades when the flocculants and coagulants are stirred into the wastewater.

Similar to the third elixir, the fourth elixir preferably comprises three different polymeric coagulant formulations. The first polymeric coagulant formulation is preferably a first anionic polymer with a high molecular weight and high charge density. The second polymeric coagulant formulation preferably comprises a second anionic polymer with a high molecular weight and high charge density. And the third polymeric coagulant formulation preferably comprises a liquid emulsion anionic polymer with a high molecular weight and a high charge density. It is presently preferred that the polymeric coagulant formulations used in this fourth elixir are FLOCULITE 600 that has a specific gravity of 1.15 and a solubility in water of 20, FLOCULITE 550 that has a specific gravity of 1.15 and a solubility in water of 1, and FLOCULITE 260 that has a boiling point of ninety-three point three degrees Celsius, a specific gravity of 1.00, vapor pressure of seventeen point five millimeters of mercury at twenty degrees Celsius and a solubility in water of 100, all of which are manufactured by DuBois Chemicals of Cincinnati, Ohio.

The formulation for the fourth elixir is more fully described in a copending U.S. patent application Ser. No. 09/664,638, which is fully incorporated herein by reference.

The third and fourth elixirs of the present invention tend to provide optimal performance when used in conjunction with one another. In a presently preferred embodiment, both elixirs are used together. However, each elixir does individually provide beneficial results. Therefore, a user may choose to use only one of either elixir three or four. Depending on the composition of an individual plant's wastewater, it may still be very effective to use only one of these two elixirs in the wastewater treatment process of the present invention.

The Process

Referring now to FIG. 1, a presently preferred embodiment of the present invention comprises a continuous process for treating wastewater using tanks. The process preferably begins at influent tank 10. Influent tank 10 collects the metal-laden wastewater and feeds it to first treatment tank 12 via pump 14. The use of influent tank 10 may provide many benefits. For example, because wastewater may not be generated by a plant at a consistent rate, influent tank 10 may serve as a buffer between the plant and the wastewater treatment process, helping to ensure that the flow into first treatment tank 12 is uniform. Furthermore, influent tank 10 can store any wastewater generated by a plant in the event that the wastewater treatment process is not in operation.

From influent tank 10, the wastewater is sent to first treatment tank 12. The first treatment tank 12 preferably contains water to dilute the incoming wastewater, although this is not required for the process to be effective. As the wastewater is fed into first treatment tank 12, its oxidation reduction potential (ORP) is measured by ORP meter 13. The ORP meter 13 is preferably positioned in the pipeline that feeds first treatment tank 12, as illustrated in FIG. 1, but it may alternately be positioned to read the ORP of wastewater actually within first treatment tank 12. The reading from the ORP meter 13 is preferably acquired by a computer automated process control system that is further described herein.

The pH level of the wastewater inside the first treatment tank 12 is preferably measured by pH meter 15. The pH of the wastewater within the first treatment tank 12 is preferably then adjusted to a level within a range of pH 8.5 to 10.2, more preferably within a range of pH 9.3 to pH 9.5, by adding appropriate quantities of an acidic solution and/or a basic solution. A known and preferred acid used for this purpose is sulfuric acid, and a known and preferred base used for this purpose is caustic soda. Although these are known in the industry, other acids and bases may be substituted for the ones mentioned here.

Preferably the pH adjustment process is computer automated using data acquisition and process control software. A preferred data acquisition and process control software program line is National Instruments' "Lookout" line of software products.

The acid and base solutions used to adjust the pH of the wastewater in first treatment tank 12 are preferably stored in tanks. Acid tank 16 feeds the acidic solution into first treatment tank 12 via metering pump 20. Base tank 18 feeds the basic solution into first treatment tank 12 via metering pump 22. And mixer 32 mixes the wastewater with the acid or base solution introduced into first treatment tank 12.

After the pH level of the wastewater is adjusted, preferably both elixirs one and two are added to the wastewater in first treatment tank 12. Preferably, elixirs one and two are simultaneously added to the wastewater within treatment tank 12 but at different locations within the tank 12. More preferably, elixirs one and two are added at different heights within the treatment tank 12. In an alternate embodiment, elixir one may be added first to the treatment tank 12, and a short time thereafter elixir two may be added. These two elixirs tend to precipitate metals out of the wastewater and prepare the wastewater for the flocculation and coagulation stage.

Elixir one is preferably stored in tank 24, and elixir two is preferably stored in tank 26. Each tank preferably has a mixer (25, 27) which continuously blends each elixir. Elixir one is fed into first treatment tank 12 via metering pump 28 and elixir two is fed into first treatment tank 12 via metering pump 30.

In a presently preferred embodiment, the flow rate of elixir one into first treatment tank 12 is dependent at least in part upon the flow rate of the wastewater into first treatment tank 12 and the ORP level of the wastewater. After these two variables are determined, the flow rate of elixir one may be calculated on the fly. Metering pump 28 then preferably feeds elixir one into first treatment tank 12 at the calculated flow rate. The flow rate of elixir two is preferably directly proportional to the calculated flow rate of elixir one, thus, once the flow rate for elixir one is calculated, the flow rate of elixir two can be determined. In another embodiment, the flow rate of elixir two may be calculated directly from the ORP level reading and the flow rate meter reading for the wastewater. It is presently preferred that 1.5 to 2.2 parts of elixir two are added to the wastewater for every one part of elixir one that is added. In alternate embodiments, a higher or lower quantity of either elixir one or elixir two may be added, depending on the specific composition of the wastewater.

It is preferred that the calculation of flow rates for elixirs one and two are done by an automated computer using data acquisition and process control software. As discussed herein, a preferred type of process control software is National Instruments' "Lookout" program. The data acquisition and process control software may be programmed by the user with the necessary formulas that convert the ORP meter and flow rate meter readings into flow rates for elixirs one and two.

As elixirs one and two are added to the first treatment tank 12, mixer 32 preferably blends the elixirs into the wastewater. Mixer 32 is run at a high speed to ensure thorough mixing of the elixirs and wastewater.

Elixirs one and two tend to cause the majority of the metals present in the wastewater to precipitate out. Tests have shown that over 99% of the metals present in the wastewater will be extracted from the wastewater solution due to the chemical reactions caused by elixirs one and elixir two.

The precipitated metals form flocs and tend to remain suspended in the wastewater because the bulk of the flocs are generally too small and lightweight to settle out. In order to force the flocs to combine into larger particles that will settle out of the wastewater, the wastewater is sent to polymer tank 34 via pipeline 33 where it is preferably mixed with elixir three. Elixir three tends to have two different effects on the wastewater. One effect is that it will act to neutralize the negative charges of the flocs, which will allow the flocs to aggregate into larger particles, this process being known as flocculation. Another effect is that the individual cationic polymer molecules will act as "bridges" between two or more anionic flocs to connect them, this process being known as coagulation.

Elixir three is preferably stored in tank 36 and continuously blended by mixer 37. Metering pump 40 feeds elixir three into polymer tank 34. As was the case for elixir two, the flow rate of elixir three into the wastewater is preferably dependent upon the flow rate calculated for elixir one, wherein preferably one-half of a part of elixir three is added for every one part of elixir one added.

As illustrated in the presently preferred embodiment of FIG. 1, elixir three is introduced directly into pipeline 33 to mix with the wastewater prior to the wastewater exiting the pipeline 33 and entering the polymer tank 34. In this embodiment, pipeline 33 preferably terminates at a point within the interior of polymer tank 34. In addition, a static mixer is preferably located within pipeline 33 downstream of where elixir three is added to extensively mix elixir three with the wastewater.

In addition to elixir three, it is presently preferred that a fourth elixir be added to the wastewater. This fourth elixir tends to make the flocculation and coagulation process more effective, aids in sludge thickening, and helps increase the rate of floc settlement.

As with elixir three, it is presently preferred that elixir four be introduced directly into pipeline 33 to mix with the wastewater at a location upstream of the static mixer and proximate to where elixir three is introduced into pipeline 33. The fourth elixir is preferably stored in tank 38, and blended by mixer 39. Metering pump 42 preferably feeds the fourth elixir into pipeline 33, although as depicted in FIG. 1 the fourth elixir can be added into the polymer tank 34. And similar to elixirs two and three, the flow rate of elixir four is preferably dependent upon the flow rate of elixir one, wherein one-fourth of a part of elixir four is preferably added for every one part of elixir one added.

Elixirs three and four tend to flocculate, coagulate, and settle the metals out of the wastewater in under one minute. By comparison, known wastewater treatment processes can take up to several hours to complete this flocculation and settling stage.

It is preferred that within polymer tank 34, mixer 44 slowly agitates the wastewater with elixirs three and four. Mixer 44 is preferably run slowly in order to minimize the number of polymers being chopped and turned inactive, and to prevent the mixer blades from breaking up any of the larger flocs that are being formed. The agitation action tends to further induce the elixirs to react with the suspended metals and aggregate them into larger particles, and it tends to keep the growing flocs suspended in the wastewater. In this preferred embodiment, keeping the large flocs suspended in the wastewater while in the polymer tank 34 is important because as the flocs grow, they will try to settle to the bottom of the polymer tank 34. Although the process of the present invention is designed to cause the precipitated metals to settle out of the wastewater it is preferred that the settling occur in a tank other than the polymer tank itself. Therefore, agitation by mixer 44 tends to keep the flocs suspended in the wastewater so that they may pass on to the clarifier 46, where the large flocs may then settle out of the wastewater.

In the clarifier 46, the flocs in the wastewater are allowed to settle out of the wastewater. Any flocs that do not settle out of the wastewater may be filtered out. In known systems, the flocs tend to be slimy and cling to any filters used in the process. Unlike those processes, another advantage of the present invention is that it produces a non-slimy floc that tends to be easily hosed off of filters. This greatly prolongs the life of any filters used in this process and reduces down time for the process.

Finally, the treated wastewater is preferably sent to a post-treatment holding tank 48 where it is stored until it is eventually released to a POTW or to the environment. There tends to be no pH adjustment required prior to discharging the treated wastewater because the process of the present invention results in a treated wastewater that is typically at a proper pH level for discharge.

Figure 2:
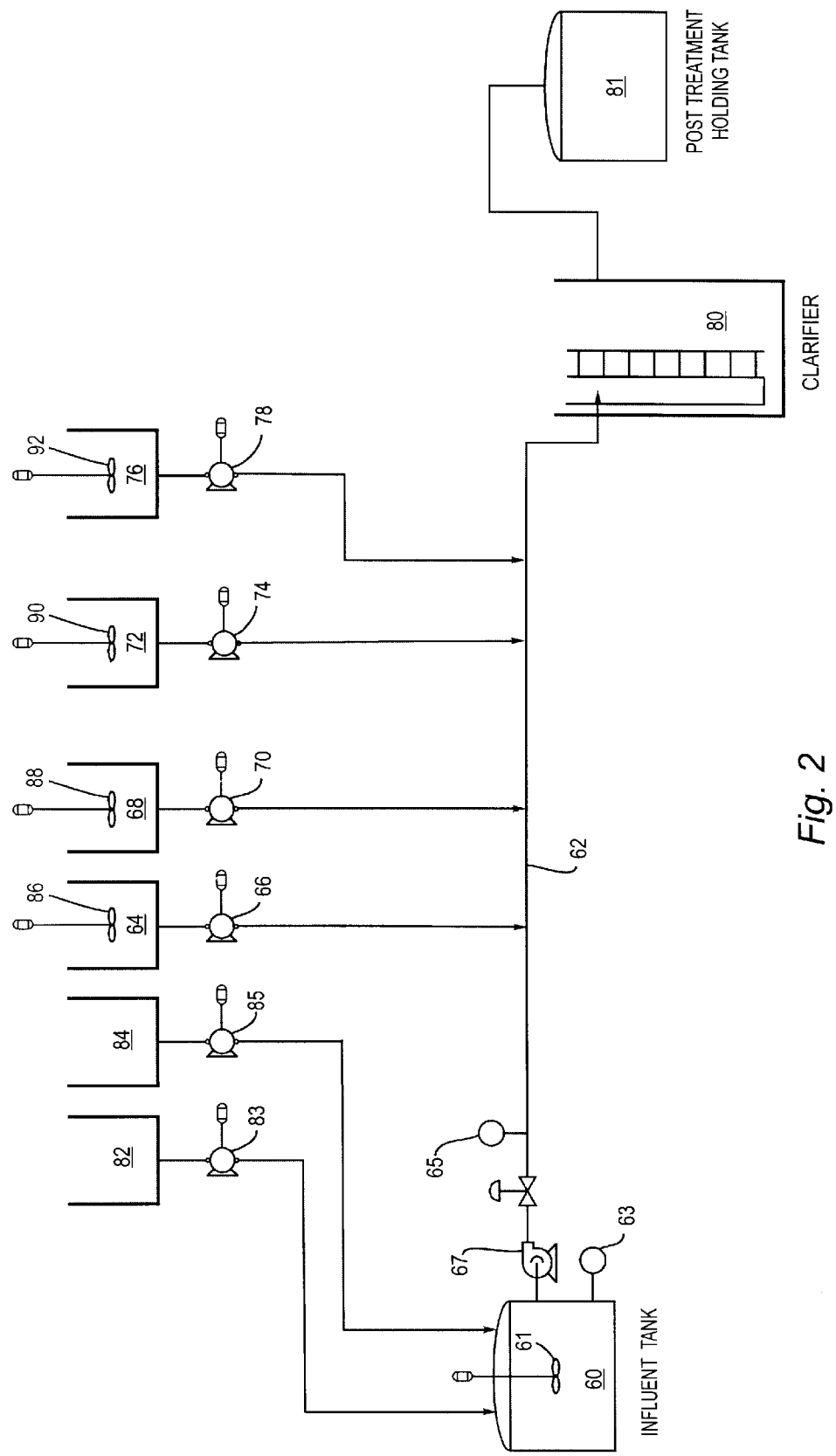
FIG. 2 is an illustration of the physical equipment that is used to carry out the process of the present invention in a continuous manner using an in-pipe system.

Referring now to FIG. 2, in another embodiment of the present invention the process may be performed using a continuous in-pipe process. The wastewater preferably begins at influent tank 60. The use of influent tank 60 provides many benefits, as are outlined herein.

While the wastewater is in tank 60, its pH level is measured by pH probe 63. The pH level of the wastewater is preferably adjusted to be within a range of pH 8.5. to pH 10.2, more preferably between pH 9.3 and pH 9.5, by adding appropriate quantities of an acidic solution and/or a basic solution. As discussed herein, a known acid used for this purpose is sulfuric acid, and a known base used is caustic soda. Other known acids and bases may be substituted for the ones mentioned herein.

The pH adjustment process is preferably computer automated using data acquisition and process control software, such as the "Lookout" line of programs by National Instruments. A pH probe and a flow rate meter can provide the data typically required by the process control software.

The acid and base solutions used to adjust the pH of the wastewater in influent tank 60 are preferably stored in tanks. Acid tank 82 feeds an acidic solution into influent tank 60 via metering pump 83. Base tank 84 feeds a basic solution into influent tank 60 via metering pump 85. The wastewater is preferably mixed with the acid or base solution introduced into influent tank 60 by mixer 61.

Either before or as the wastewater is fed into pipeline 62, its oxidation reduction potential (ORP) is measured by ORP meter 65. Preferably the ORP level is measured while the wastewater is still within influent tank 60.

The wastewater is then sent into pipeline 62 by pump 67. The ORP level may be measured here instead of in influent tank 60. Next, elixir one is introduced directly into pipeline 62 to mix with the wastewater. Preferably downstream of where elixir one is added, elixir two is also introduced directly into pipeline 62 to mix with the wastewater. These two elixirs tend to cause precipitation of the metals and prepare the wastewater for the flocculation stage. Elixir one is preferably stored in tank 64, and elixir two is preferably stored in tank 68. Each tank may have a mixer (86, 88) which preferably continuously blends each elixir while in its tank. Elixir one is fed into pipeline 62 via metering pump 66 and elixir two is fed into pipeline 62 via metering pump 70.

Similar to the continuous process using tanks, the flow rate of elixir one into pipeline 62 preferably depends upon the flow rate of the wastewater into the pipeline 62 and the ORP level of the wastewater. After these two variables are established, the flow rate of elixir one may be calculated. Metering pump 66 then preferably feeds elixir one into pipeline 62 at that calculated flow rate. As for elixir two, again, its flow rate is preferably directly proportional to the calculated flow rate of elixir one, preferably with 1.5 to 2.2 parts of elixir two added for every one part of elixir one added. In a presently preferred embodiment, calculating the flow rates for elixirs one and two is done by an automated process using data acquisition and process control software such as the "Lookout" program described above.

Elixirs one and two tend to cause a majority of the metals present in the wastewater to precipitate out. The precipitated metals tend to form small flocs and typically remain suspended in the wastewater because of their small size. To force the flocs to combine into larger particles and settle out of the wastewater, elixir three is preferably introduced into the wastewater in pipeline 62 at a location downstream of elixir two. As described above, elixir three typically acts to flocculate and coagulate the precipitated metals. Elixir three is preferably stored in tank 72. Metering pump 74 feeds elixir three into pipeline 62. As was the case for elixir two, the flow rate of elixir three is preferably dependent upon the flow rate calculated for elixir one, wherein one-half of a part of elixir three is added for every one part of elixir one added.

As shown in the illustration of FIG. 2, it is presently preferred that a fourth elixir be introduced directly into pipeline 62 to mix with the wastewater. As explained above, the fourth elixir tends to make the flocculation and coagulation process more effective, tends to aid in sludge thickening, and tends to aid in increasing the rate of floc settlement. The fourth elixir is preferably stored in tank 76. Metering pump 78 feeds the fourth elixir into pipeline 62. As was the case with elixirs two and three, the flow rate of elixir four is preferably dependent upon the flow rate of elixir one, wherein one-fourth of a part of elixir four are added for every one part of elixir one added. As the wastewater flows through pipeline 62, elixirs three and four tend to flocculate, coagulate, and settle the metals out of the wastewater in under one minute.

In this presently preferred embodiment, pipeline 62 contains up to four static mixers that are each located just downstream of where an elixir is introduced into the wastewater. The static mixers cause each elixir that is added to the wastewater to be thoroughly mixed with the wastewater.

The wastewater then leaves pipeline 62 and enters clarifier or settling tank 80. In this tank, the flocs in the wastewater tend to settle out, and any flocs that remain suspended may be filtered out. As discussed above, the process of the present invention produces a non-slimy floc that is easily removed from the filters, which prolongs filter life and reduces down time.

Finally, the treated wastewater is preferably sent to a post-treatment holding tank 81 for storage until it is eventually released to a POTW or to the environment. Again, there tends to be no pH adjustment required prior to discharging the treated wastewater because the process of the present invention typically results in a treated wastewater that is at a proper pH level for discharge.

Another embodiment of the process of the present invention is a batch process. It is known in the industry for plants to use batch processes to treat wastewater in lieu of a continuous process. A batch process is typically considered the simplest and most dependable type of treatment process because batch processes tend to be easier to control and the wastewater being treated is typically not discharged to sewers or the environment until after a satisfactory level of treatment is achieved. In a batch process the treatment tank is filled with wastewater, the wastewater in the tank is treated in order to remove the metal contaminants, the tank is emptied, and the process is then repeated. In some processes, more than one tank may be necessary for efficient operation.

In the batch process of the present invention, the wastewater is first introduced into a treatment tank where it will be treated. The ORP level of the wastewater is preferably measured while it is in the tank. Next, the pH level of the wastewater in the tank is measured and preferably adjusted to be within a range of pH 8.5 to pH 10.2, more preferably within a range of pH 9.3 to pH 9.7. The adjustment is made by adding appropriate amounts of an acidic solution and/or a basic solution.

Elixirs one and two are then preferably added to the wastewater. The amount of elixir one that is added preferably depends upon the quantity of wastewater in the tank and the ORP level of the wastewater. The amount of elixir two added is again preferably dependent upon the quantity of elixir one added. As was the case above, preferably 1.5 to 2.2 parts of elixir two are added to the wastewater for every one part of elixir one added.

Preferably, elixir two is added to the wastewater simultaneously with elixir one, but preferably at a different location within the treatment tank. The addition of elixirs one and two tend to precipitate metals out of the wastewater, forming metal precipitates, and tend to preclude these metals from re-dissolving back into the wastewater.

Finally, elixir three and elixir four are preferably added to the wastewater. These two elixirs tend to coagulate and flocculate the suspended metals and force them to settle out of the wastewater at a relatively fast rate. The quantities of elixir three and four added are preferably dependant upon the quantity of elixir one added, wherein one-half of a part of elixir three and one-fourth of a part of elixir four are added for every one part of elixir one that was added. In alternate embodiments, elixir three or elixir four may be used independently.

The end result of both the continuous and batch processes of the present invention outlined above tends to be a clear, odorless supernatant, the supernatant being water in this process, and a fine, non-slimy floc as sludge. The supernatant typically contains less than 1% dissolved metals and can therefore be recycled. The sludge typically contains a high percentage of metal. As explained above, in known systems the floc produced is slimy and tends to cling to filters, reducing the life of the filter. In the present invention, the floc produced is non-slimy.

Figure 3:
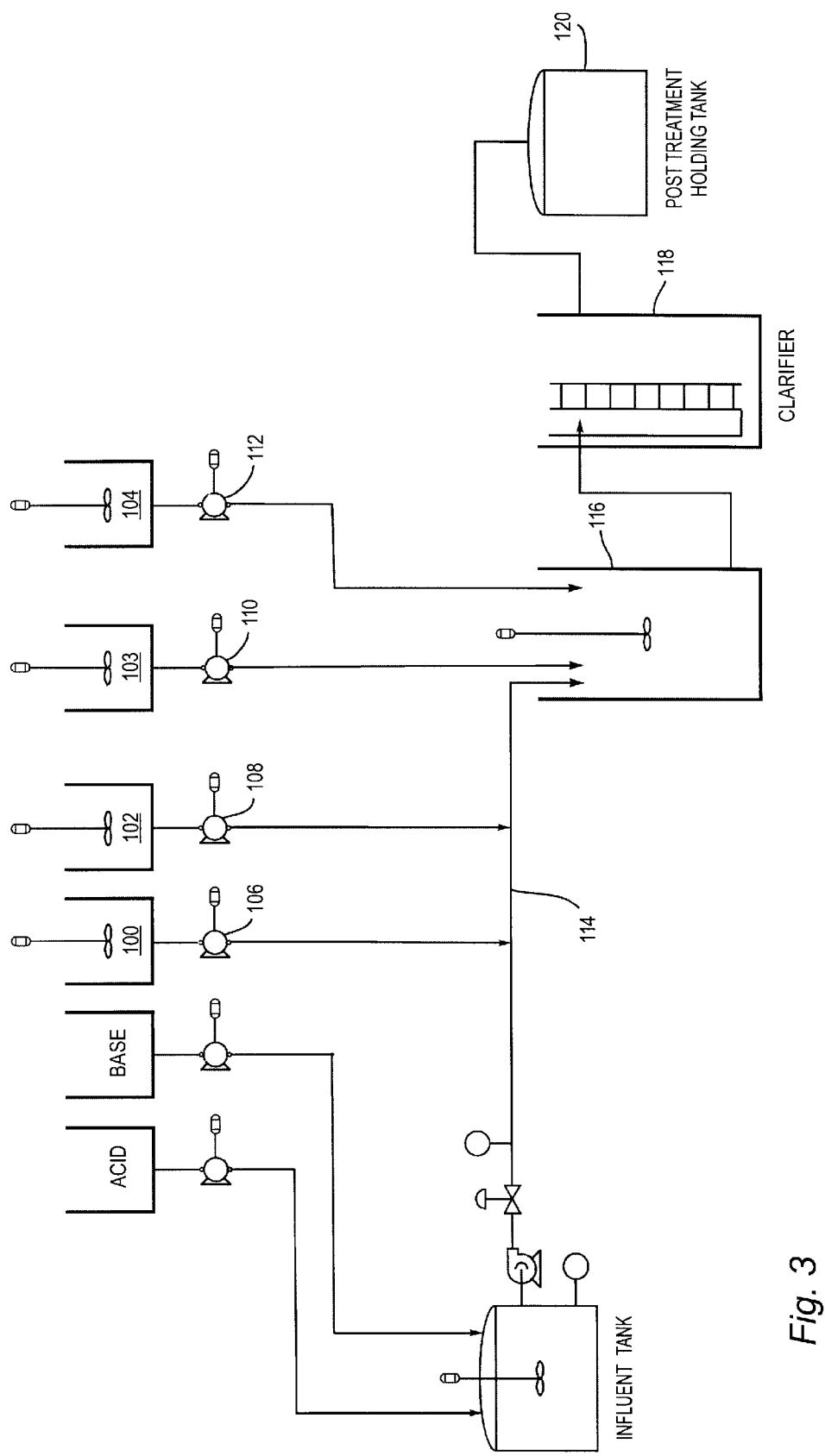
FIG. 3 is an illustration of the physical equipment that is used to carry out the process of the present invention in a continuous manner using a combination of an in-pipe system and a tank system.
Figure 4:
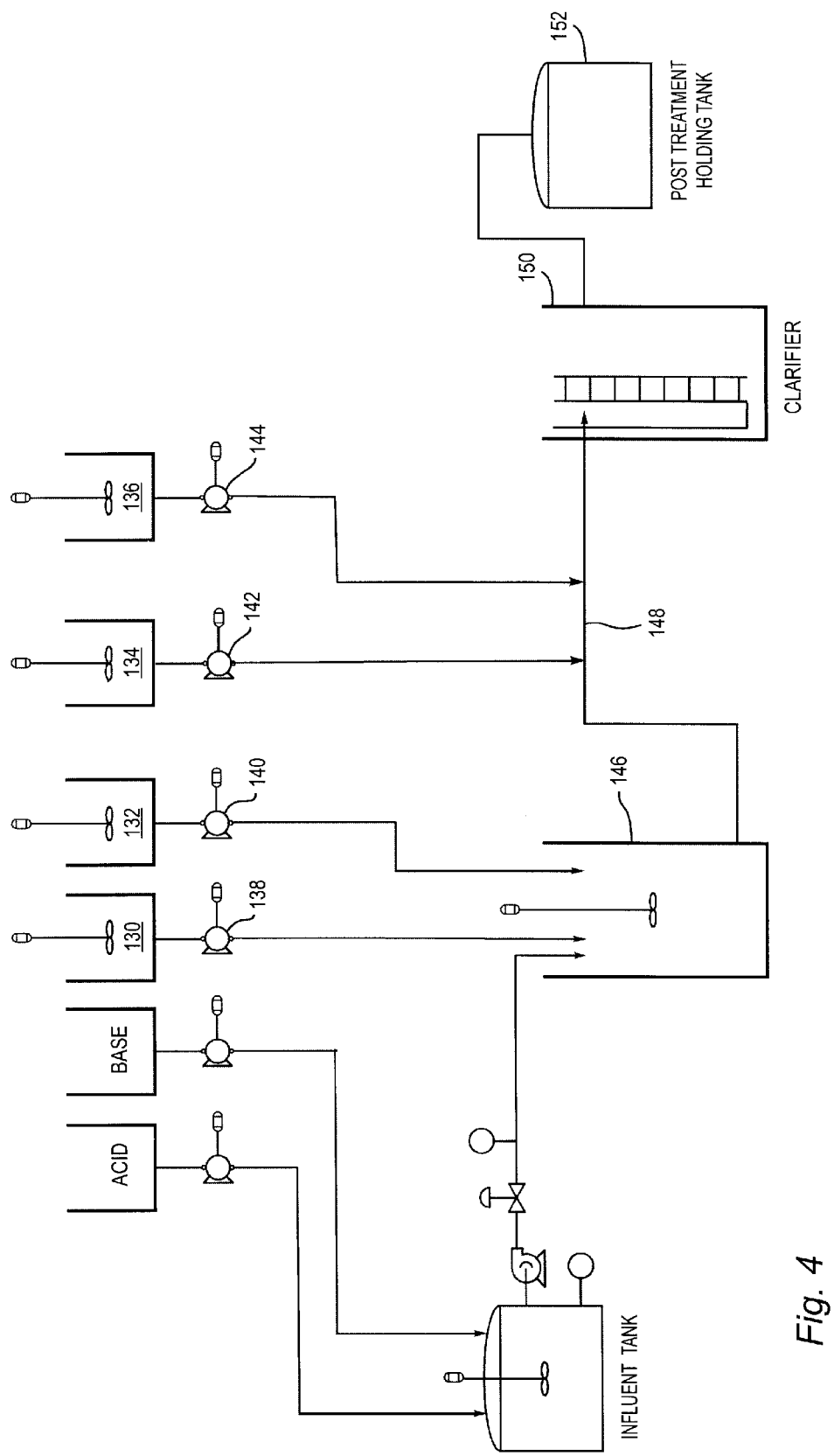
FIG. 4 is an illustration of the physical equipment that is used to carry out the process of the present invention in a continuous manner using an alternate combination of an in-pipe system and a tank system.

Turning now to FIGS. 3 and 4, it is shown that other configurations of the present invention are possible. The in-pipe and tank processes may be combined in several different configurations, only two of which are illustrated herein.

As shown in FIG. 3, elixirs one and two may be added to the wastewater via an in-pipe configuration, while elixirs three and four are added via a treatment tank. Tank 100 stores elixir one and tank 102 stores elixir two, and these elixirs are added to pipe 114 by metering pumps 106 and 108 respectively. Static mixers are preferably located in pipeline 114 to thoroughly mix elixirs one and two into the wastewater. The wastewater then flows into treatment tank 116 where it is mixed with elixirs three and four. Elixir three is stored in tank 103 and elixir four is stored in tank 104. They are delivered to the treatment tank 116 by metering pumps 110 and 112 respectively. Thus, the precipitation of metals by elixirs one and two occurs in-pipe, and the coagulation and flocculation by elixirs three and four occurs in a tank. The wastewater may then be moved to a clarifier 118, and finally to a holding tank 120.

Alternatively, the precipitation of metals by elixirs one and two may occur in a treatment tank, and the coagulation and flocculation stage may occur in-pipe, as shown in FIG. 4. Tank 130 holds elixir one and tank 132 holds elixir two. The elixirs are delivered by metering pumps 138 and 140 to treatment tank 146, where they are mixed with the wastewater to remove metals. The wastewater is then sent to pipe 148 where it is mixed with elixirs three and four for the flocculation and coagulation process. Static mixers are located in pipeline 148 to cause the elixirs to be thoroughly mixed with the wastewater. Tank 134 holds elixir three and tank 136 holds elixir four. Metering pumps 142 and 144 deliver the elixirs to the pipe 148. The wastewater may then flow into a clarifier 150 and finally to a holding tank 152.

Figure 5:
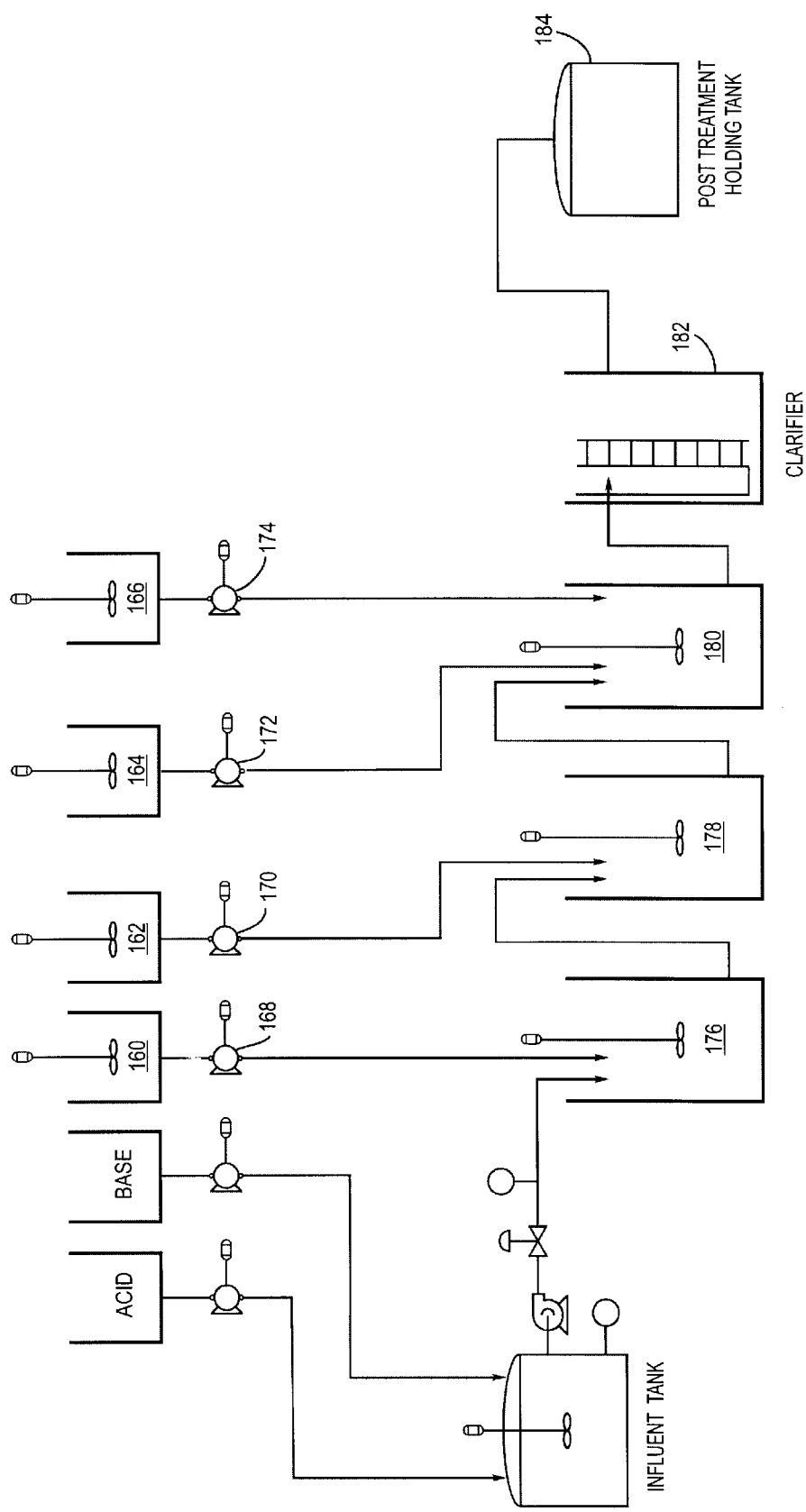
FIG. 5 is an illustration of the process of the present invention being used in a known wastewater treatment system.

Turning now to FIG. 5, the process and elixirs of the present invention may also be used with wastewater treatment equipment found in known systems. For example, FIG. 5 illustrates use of the present invention in a multi-tank treatment system. The precipitation of metals by elixirs one and two takes place in two tanks. Elixir one from tank 160 is delivered by metering pump 168 into a first treatment tank 176 to be mixed with the wastewater. The wastewater then moves on to a second treatment tank 178, and elixir two from tank 162 is delivered by metering pump 170 into the treatment tank 178 to be mixed with the wastewater. Next, the wastewater is transferred to a third treatment tank 180 where the coagulation and flocculation process occurs using elixirs three and four. Tanks 164 and 166 store elixirs three and four, and metering pumps 172 and 174 deliver these elixirs into the treatment tank 180 to be mixed into the wastewater. After the coagulation and flocculation stage, the treated wastewater is typically moved to a clarifier tank 182, and then to a holding tank 184.

While particular methods have been described for using the process of the present invention for wastewater treatment, it will be apparent to those of ordinary skill in the art of wastewater treatment that other embodiments and alternative steps are also possible without departing from the spirit and scope of the invention. Accordingly, the above description should be construed as illustrative, and not in a limiting sense, the scope of the invention being defined by the following claims.

What is claimed:

1. A method for treating wastewater containing metals in solution, comprising:
    measuring the flow rate of the wastewater as it is fed into a first treatment tank;
    measuring the oxidation reduction potential of the wastewater;
    adjusting the pH of the wastewater to a level within a range of pH 8.5 to pH 10.2;
    mixing a first liquid elixir and a second liquid elixir into the wastewater, wherein said first elixir consists essentially of a mixture of water, ferrous sulfate, aluminum sulfate, a sulfuric acid solution, and a solution of an aluminum salt and a cationic polyelectrolyte coagulant;
    wherein the first liquid elixir is added to react with at least one metal in the wastewater to cause it to either precipitate out of solution, or convert into a form that will allow it to be precipitated out of solution by the second liquid elixir, and to bond with the metal to prevent it from re-dissolving back into solution, wherein the quantity of the first liquid elixir added to the wastewater is determined based at least in part upon the oxidation reduction potential of the wastewater and further based at least in part upon the flow rate of the wastewater; and
    wherein the second liquid elixir is added to react with at least one metal in the wastewater to cause it to precipitate out of solution, and to bond with the metal to prevent it from re-dissolving back into solution, wherein the quantity of the second liquid elixir added to the wastewater is determined based at least in part upon the quantity of the first liquid elixir added to the wastewater.

2. The method of claim 1, further comprising:
    feeding the wastewater into a second treatment tank;
    mixing a third liquid elixir into the wastewater to flocculate and/or coagulate precipitated metals, wherein the quantity of the third liquid elixir added to the wastewater is determined based at least in part upon the quantity of the first liquid elixir added to the wastewater; and
    separating any flocculated and/or coagulated precipitated metals from the clear water.

3. The method of claim 2, further comprising:
    mixing a fourth liquid elixir into the wastewater to flocculate and/or coagulate precipitated metals, wherein the quantity of the fourth liquid elixir added to the wastewater is determined based at least in part upon the quantity of the first liquid elixir added to the wastewater.

4. The method of claim 3, wherein one-fourth of a part of the fourth liquid elixir is added for every one part of the first elixir added.

5. The method of claim 3, wherein the fourth liquid elixir comprises:
    a cationic polyelectrolyte;
    a solution comprising a cationic polyelectrolyte, an acrylamide, and a cationic monomer; and
    a liquid emulsion comprising a cationic polymer.

6. The method of claim 3, wherein the fourth liquid elixir comprises:
    a first anionic polymer;
    a second anionic polymer; and
    a liquid emulsion anionic flocculant.

7. The method of claim 2, wherein one-half of a part of the third liquid elixir is added for every one part of the first elixir added.

8. The method of claim 2, wherein the third liquid elixir comprises:
    a cationic polyelectrolyte;
    a solution comprising a cationic polyelectrolyte, an acrylamide, and a cationic monomer; and
    a liquid emulsion comprising a cationic polymer.

9. The method of claim 2, wherein the third liquid elixir comprises:
    a first anionic polymer;
    a second anionic polymer; and
    a liquid emulsion anionic flocculant.

10. The method of claim 1, wherein 1.5 to 2.2 parts of the second liquid elixir are added for every one part of the first elixir added.

11. The method of claim 1, wherein the pH of the wastewater is adjusted to a level within a range of pH 9.3 to pH 9.5.

12. The method of claim 1, wherein the second liquid elixir comprises:
   calcium hydroxide;
   sodium dimethyl dithiocarbamate;
   calcium hypochlorite;
   sodium hydroxide;
   an alkaline material that assists in precipitating metals;
   a combination of a calcium salt and a first polymeric coagulant; and
   a second polymeric coagulant.

13. The method of claim 1, wherein the pH adjustment is carried out by adding appropriate amounts of an acidic solution and/or a basic solution to the wastewater.

14. The method of claim 13, wherein the acidic solution comprises sulfuric acid.

15. The method of claim 13, wherein the acidic solution comprises phosphoric acid.

16. An in-pipe method for treating wastewater containing metals in solution, comprising:
   adjusting the pH of the wastewater to a level within a range of pH 8.5 to pH 10.2;
   measuring a flow rate of the wastewater as it flows through a pipeline;
   measuring an oxidation reduction potential of the wastewater;
   adding a first liquid elixir and a second liquid elixir to the wastewater within the pipeline, wherein said first elixir consists essentially of a mixture of water, ferrous sulfate, aluminum sulfate, a sulfuric acid solution, and a solution of an aluminum salt and a cationic polyelectrolyte coagulant;
   wherein the first liquid elixir is added to react with at least one metal in the wastewater to cause it to either precipitate out of solution, or convert into a form that will allow it to be precipitated out of solution by the second liquid elixir, and to bond with the metal to prevent it from re-dissolving back into solution, wherein the quantity of the first elixir added to the wastewater is determined based at least in part upon the oxidation reduction potential of the wastewater and further based at least in part upon the flow rate of the wastewater; and
   wherein the second liquid elixir is added to react with at least one metal in the wastewater to cause it to precipitate out of solution, and to bond with the metal to prevent it from re-dissolving back into solution, wherein the second elixir is added downstream of where the first elixir is added and the quantity of the second elixir added to the wastewater is determined based at least in part upon the quantity of the first elixir added to the wastewater.

17. The method of claim 16, further comprising:
   adding a third liquid elixir to the wastewater to flocculate and/or coagulate precipitated metals, wherein the third elixir is added downstream of where the second elixir is added and the quantity of the third elixir added to the wastewater is determined based at least in part upon the quantity of the first elixir added to the wastewater; and
   separating the flocculated and/or coagulated precipitated metals from the clear water.

18. The method of claim 17, further comprising:
   adding a fourth liquid elixir to the wastewater to flocculate and/or coagulate precipitated metals, wherein the fourth elixir is added downstream of where the third elixir is added and the quantity of the fourth elixir added to the wastewater is determined based at least in part upon the quantity of the first elixir added to the wastewater.

19. The method of claim 16, wherein the pH of the wastewater is adjusted to a level within a range of pH 9.3 to pH 9.5.

20. A batch method for treating wastewater containing metals in solution, comprising:
   feeding the wastewater into a treatment tank;
   measuring the oxidation reduction potential of the wastewater;
   adding appropriate amounts of an acidic solution and/or a basic solution to adjust the pH of the wastewater to a level within a range of pH 8.5 to pH 10.2;
   mixing a first liquid elixir and a second liquid elixir into the wastewater, wherein said first elixir consists essentially of a mixture of water, ferrous sulfate, aluminum sulfate, a sulfuric acid solution, and a solution of an aluminum salt and a cationic polyelectrolyte coagulant,
   wherein the first liquid elixir is added to react with at least one metal in the wastewater to cause it to either precipitate out of solution, or convert into a form that will allow it to be precipitated out of solution by the second liquid elixir, and to bond with the metal to prevent it from re-dissolving back into solution, wherein the quantity of the first liquid elixir added to the wastewater is determined based at least in part upon the oxidation reduction potential of the wastewater and based at least in part upon the quantity of the wastewater; and
   wherein the second liquid elixir is added to react with at least one metal in the wastewater to cause it to precipitate out of solution, and to bond with the metal to prevent it from re-dissolving back into solution, wherein the quantity of the second liquid elixir added to the wastewater is determined based at least in part upon the quantity of the first liquid elixir added to the wastewater.

21. The method of claim 20, further comprising:
   mixing a third liquid elixir into the wastewater to flocculate and/or coagulate precipitated metals, wherein the quantity of the third liquid elixir added to the wastewater is determined based at least in part upon the quantity of the first liquid elixir added to the wastewater; and
   separating the flocculated and/or coagulated precipitated metals from the clear water.

22. The method of claim 21, further comprising:
   mixing a fourth liquid elixir into the wastewater in order to flocculate and/or coagulate precipitated metals, wherein the quantity of the fourth liquid elixir added to the wastewater is determined based at least in part upon the quantity of the first liquid elixir added to the wastewater.

23. A system for treating wastewater, comprising:
   a first treatment tank;
   a heavy duty continuous mixer located within the first treatment tank;
   an oxidation reduction potential measuring instrument;
   a pH measuring instrument that is positioned to measure the pH of wastewater inside the first treatment tank;
   an acidic solution input line to the first treatment tank;
   a first metering pump to control the flow rate of the acidic solution into the first treatment tank;

a basic solution input line to the first treatment tank;

a second metering pump to control the flow rate of the basic solution into the first treatment tank;

a storage tank containing a first elixir consisting essentially of a mixture of water, ferrous sulfate, aluminum sulfate, a sulfuric acid solution, and a solution of an aluminum salt and a cationic polyelectrolyte coagulant a first liquid elixir input line from said storage tank to the first treatment tank;

a third metering pump to control the flow rate of the first liquid elixir into the first treatment tank;

a second liquid elixir input line to the first treatment tank;

a fourth metering pump to control the flow rate of the second liquid elixir into the first treatment tank;

a second treatment tank;

a second heavy duty continuous mixer located within the second treatment tank;

a passage for wastewater to flow from the first treatment tank to the second treatment tank;

a third liquid elixir input line to the second treatment tank; and a fifth metering pump to control the flow rate of the third liquid elixir into the second treatment tank.

24. The system of claim 23, further comprising:

a fourth liquid elixir input line to the third treatment tank; and a sixth metering pump to control the flow rate of the fourth liquid elixir into the second treatment tank.

25. The system of claim 23, wherein the oxidation reduction potential measuring instrument is positioned to measure the oxidation reduction potential of wastewater inside the first treatment tank.

26. The system of claim 23, wherein the oxidation reduction potential measuring instrument is positioned to measure the oxidation reduction potential of wastewater being input into the first treatment tank.

27. A system for treating wastewater, comprising:

a pipeline;

one or more static mixers;

an oxidation reduction potential measuring instrument positioned to measure wastewater within the pipeline;

a pH measuring instrument positioned to measure the pH of wastewater within the pipeline;

an acidic solution input line to the pipeline;

a first metering pump to control the flow rate of the acidic solution into the pipeline;

a basic solution input line to the pipeline;

a second metering pump to control the flow rate of the basic solution into the pipeline;

a storage tank containing a first elixir consisting essentially of a mixture of water, ferrous sulfate, aluminum sulfate, a sulfuric acid solution, and a solution of an aluminum salt and a cationic polyelectrolyte coagulant a first liquid elixir solution input line from said storage tank to the pipeline;

a third metering pump to control the flow rate of the first liquid elixir solution into the pipeline;

a second liquid elixir input line from said storage tank to the pipeline located downstream of the first liquid elixir input line;

a fourth metering pump to control the flow rate of the second liquid elixir into the pipeline;

a third liquid elixir input line to the pipeline located downstream of the second liquid elixir input line; and a fifth metering pump to control the flow rate of the third liquid elixir into the pipeline.

28. The in-line system of claim 27, further comprising:

a fourth liquid elixir input line to the pipeline located downstream of the third liquid elixir input line; and a sixth metering pump to control the flow rate of the fourth liquid elixir into the pipeline.

* * * * *